United States Patent Office 3,415,298
Patented Dec. 10, 1968

3,415,298
MACHINE FOR AUTOMATICALLY SECTIONING CITRUS FRUITS
Masaru Ishibashi, Shimizu-shi, Japan, assignor to Toyo Seikan Kabushiki Kaisha (also known as Toyo Seikan Kaisha Ltd.), Tokyo-to, Japan, a joint-stock company of Japan
Filed May 12, 1966, Ser. No. 549,633
Claims priority, application Japan, June 18, 1965, 40/36,279
1 Claim. (Cl. 146—3)

ABSTRACT OF THE DISCLOSURE

The automatic sectioning of oranges in which peeled unsectioned oranges are supplied into funnel shaped sectioning baskets having apertures through which orange segments may pass into a vessel containing a water bath and provided with an outlet. Mechanism is provided to impart a combination of a horizontal rotation and a horizontal oscillatory motion to the baskets. Water jet nozzle means above and confronting each basket serve to section each orange into segments with the segments passing through the apertures into the bath and floating upwardly to be discharged from the vessel through the outlet with the overflow water.

---

Figure 1:
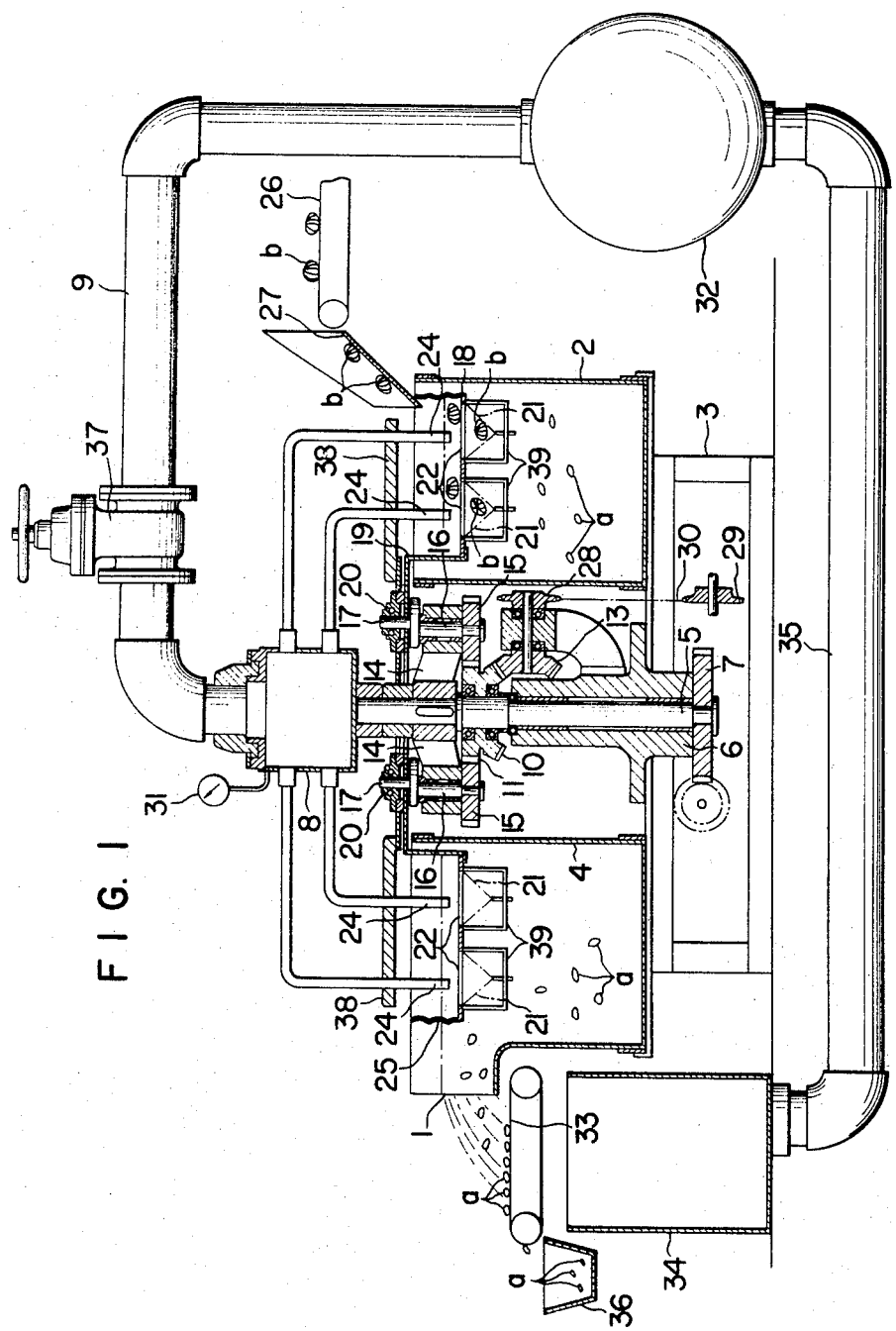

This invention relates to a new machine for automatically sectioning citrus fruits, particularly mandarin oranges of the kind called tangerines and the like, the outer rinds (or peels) of which have been removed, into separate segments (or carpels).

Heretofore, since the sectioning of citrus fruits was done by hand, this process was inefficient, and in order to effect increases in the processed quantity of the citrus fruits (hereinafter referred to as "oranges" for simplicity), it has been necessary, as a natural result, to use a larger number of workers, which expedient has been uneconomical.

With the remarkable increase in recent years in the demand for canned (tinned) oranges, particularly mandarin oranges, requiring processing of these fruits in large quantities, there has been an urgent need for development of an automatic sectioning machine capable of carrying out economical production.

It is an object of the present invention to meet this need by providing a highly efficient and economical machine for automatically sectioning oranges.

According to the present invention, briefly stated, there is provided an automatic orange sectioning machine characterized by the combination of: a water vessel holding a water bath and provided with an outlet for overflow water at the upper part thereof on one side; a basket rotary plate horizontally disposed within the water vessel; means for continuously supplying peeled, unsectioned oranges to the basket rotary plate; a large number of orange sectioning baskets each having a funnel shape for receiving said unsectioned oranges and having apertures through which segments or carpels of the oranges after sectioning can pass out of the basket into said water bath, said baskets being fastened to and supported by the basket rotary plate; a vertical main shaft driven by a power source; oscillatory driving means driven by a power source, the basket rotary plate being caused to undergo a combination of a horizontal rotation due to rotation of the main shaft and a horizontal oscillatory motion due to the oscillatory driving means independently of said rotation; and water jet nozzle means disposed above and confronting each of the orange sectioning baskets and rotating together with the basket rotary plate, each of the nozzle means operating to section each orange within the respective basket into segments by jet water force, the orange segments so sectioned passing through said apertures into said water bath and floating upwardly to be discharged from the water vessel through said outlet together with said overflow water.

The nature, principle, and details of the invention will be more clearly apparent from the following detailed description of a preferred embodiment of the invention as illustrated in the accompanying drawings, in which like parts are designated by like reference numerals and characters.

Figure 2:
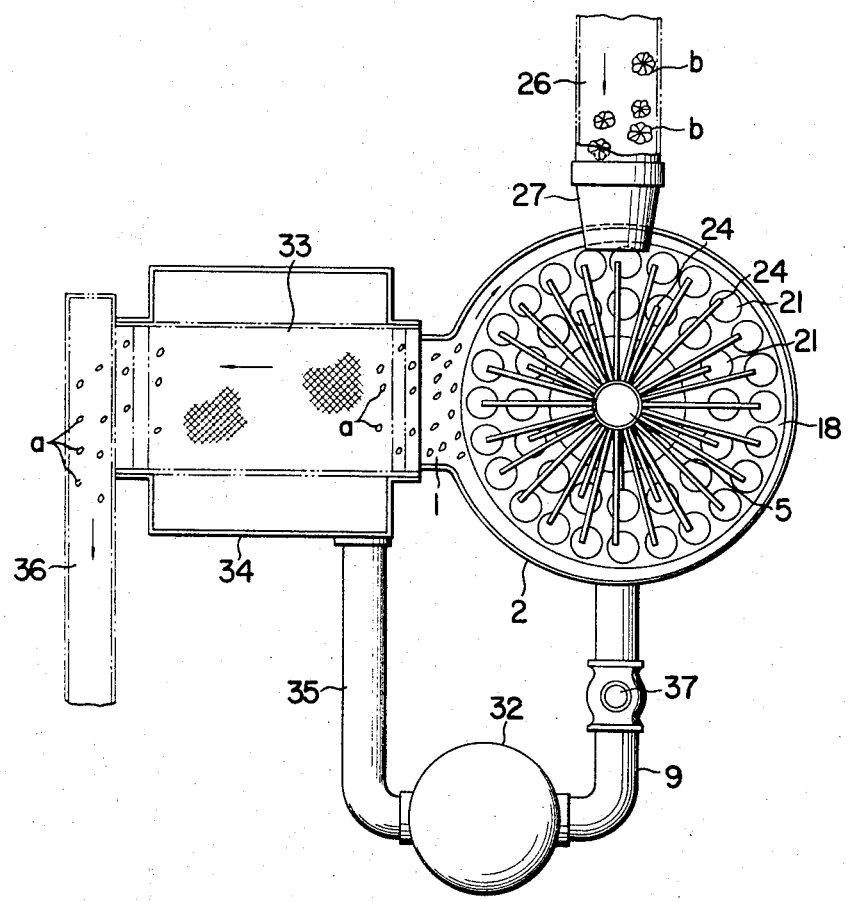

In the drawings:

FIGURE 1 is a general elevational view, partly in vertical section, showing the essential composition and arrangement of parts of an automatic orange sectioning machine embodying the invention; and FIGURE 2 is a plan view, with parts deleted, of the orange sectioning machine shown in FIGURE 1.

Referring to the drawings, the principal structure of the orange sectioning machine shown therein is an annular water vessel 2 mounted on a machine base structure 3 and provided with an outlet 1 at the upper part thereof on one side.

The water vessel 2 has a central space 4, in which there is provided a vertical main shaft 5 coaxially disposed on the centerline of the water vessel 2 and rotatably supported by a bearing 6 fixed to the base structure 3. A spiral gear 7 is fixed to the lower end of the main shaft 5, and a jet water distributor 8 is fixed to the upper end thereof.

The spiral gear 7 serves to receive motive power from a power source (not shown) and to transmit this power to the main shaft 5. The jet water distributor 8 is connected to the outlet end of a water supply pipe 9 and is capable of storing water under the required pressure within its interior.

At an intermediate part of the main shaft 5, there is provided a spur gear 11 rotatably supported on the main shaft 5 by bearings 12 interposed therebetween. On the lower surface of the spur gear 11, there is integrally formed a coaxial bevel gear 10. Thus, the spur gear 11, together with the bevel gear 10, is freely rotatable independently of the rotation of the main shaft 5 and is driven at a desired rotational speed by power from a power source (not shown) transmitted through a stepless speed changing mechanism, such as a so-called positive infinitely variable speed change mechanism (also not shown), a driving chain sprocket 29, a chain 30, a driven chain sprocket 28, and a bevel gear 13 meshed with the bevel gear 10.

The spur gear 11 is meshed with four pinions 15 fixed to respective vertical shafts 16 which are rotatably supported on the outer ends of four respective arms 14 fixed to and radially extending from the main shaft 5 immediately above the spur gear 11. Accordingly, when the main shaft rotates, the pinions 15 rotate about their own axes as they revolve about the main shaft 5. If, while the pinions 15 are thus rotating and revolving, the rotational speed of the spur gear 11 is varied, the rotational speed of the pinions 15 about their own axes will vary.

At the upper end of each shaft 16, there is fixedly provided an eccentric pin 17 which is parallel to the shaft 16 (with an offset relative thereto of approximately ¾ inch (19.1 mm.)). These eccentric pins 17 are rotatably inserted into respective pin bearings 20 fixed to an arm member 19, which is integrally formed with a horizontal basket rotary plate 18.

The basket rotary plate 18 is of annular shape and is disposed within the water vessel 2, where it undergoes a combination of a horizontal rotation and a horizontal oscillatory motion caused by the rotation of the main shaft 5 and the revolution of the eccentric pins 17 due to the rotation of the spur gear 11.

The basket rotary plate 18 is provided with a large number of orange sectioning baskets 21 arranged on two horizontal concentric circles which are coaxial with the rotary plate 18, with the upper rims of the baskets 21 being secured to the edges of respective circular holes 22 formed in the basket rotary plate 18. Each of the baskets 21 is made of a number of elastic pieces such as rubber which are gathered at their lower ends on the centerline of the respective hole 22, whereby the basket has the shape of an inverted cone or a funnel. Spaces through which orange segments $a$ can pass are left between the elastic pieces of each basket 21. The slope of the conical wall of the funnel-shape baskets is adjustable to suit the size and hardness or rigidity of the oranges being sectioned, and the baskets 21 are supported by basket support frames 39.

Vertically above each basket 21, there is disposed at least one water jet nozzle 24 having a downwardly directed outlet confronting the basket and communicating at its upstream end to the aforementioned jet water distributor 8, with the nozzles 24 being supported by a nozzle support 38. The force of each water jet thereby impinging on each orange is caused to be optimum for the size and hardness or rigidity of the oranges by adjusting the jet water flowrate.

The basket rotary plate 18 is provided at its outer periphery with a cylindrical net 25. Oranges $b$ with their outer rinds removed but prior to sectioning are supplied by a conveyor 26 by way of a chute 27 to the upper surface of the basket rotary plate 18.

A net conveyor 33 is provided at the outlet 1 to receive therefrom sectioned segments $a$ of oranges and to convey the same to a water sluice conveyor 36 for transferring the segments $a$ to the succeeding processing apparatus (not shown).

A water recovery tank 34 is positioned below the net conveyor 33 to collect water therefrom. A water pump 32 is provided to draw the water so collected through water recovery piping 35 and to recirculate this water under pressure through the aforementioned water supply pipe 9 to the jet water distributor 8. A pressure gauge 31 is provided to indicate the pressure within the jet water distributor 8, which pressure is regulated by adjusting a valve 37 for adjusting the supply water flowrate in the water supply pipeline 9.

The orange sectioning machine of the above described construction and arrangement according to the present invention operates in the following manner.

When the main shaft 5 is rotated, the arms 14 rotate, and the basket rotary plate 18 rotates in a horizontal plane and, at the same time, undergoes a horizontal oscillatory motion due to the eccentric pins 17 revolving integrally will respective pinions 15, which are meshed with the spur gear 11. Consequently, the unsectioned oranges $b$ which roll from the chute 27 onto the upper surface of the basket rotary plate 18 continue rolling thereon until they drop into the baskets 21.

Water jets directed downwardly from the nozzles 24 into respective baskets 21 impinge uniformly on the oranges $b$ which have thus dropped into the baskets 21, and the force of these jets causes these oranges $b$ to separate (be sectioned) into segments (carpels) $a$.

The orange segments $a$ which have been thus sectioned then pass through the spaces between the elastic pieces of the baskets 21 into the interior of the water vessel 2 and, floating to the upper part of the water bath contained therein, are swept by the water current flowing out of the outlet 1 onto the net conveyor 33. While being conveyed on the net conveyor 33, the segments $a$ are separated from the water, which drains off into the water recovery tank 34, and are conveyed to the water sluice conveyor 36 for conveyance to the succeeding process.

Thus, the automatic orange sectioning machine according to the present invention is capable of sectioning peeled oranges in a fully automatic and rapid manner without any manual handling of the oranges either prior to or after sectioning thereof and is, therefore, highly efficient for large quantity processing of oranges in orange canning plants.

It should be understood, of course, that the foregoing disclosure relates to only a preferred embodiment of the invention and that it is intended to cover all changes and modifications of the example of the invention herein chosen for the purposes of the disclosure, which do not constitute departures from the spirit and scope of the invention as set forth in the appended claim.

What I claim is:

1. An automatic orange sectioning machine comprising, in combination: a water vessel holding a water bath and provided with an outlet for overflow water at the upper part thereof on one side; a basket rotary plate horizontally disposed within the water vessel; means for continuously supplying peeled, unsectioned oranges to the basket rotary plate; a large number of orange sectioning baskets each having a funnel shape for receiving said unsectioned oranges and having apertures through which segments or carpels of the oranges after sectioning can pass out of the basket into said water bath, said baskets fastened to and supported by the basket rotary plate; a vertical main shaft driven by a power source; oscillatory driving means driven by a power source, the basket rotary plate being caused to undergo a combination of a horizontal rotation due to rotation of the main shaft and a horizontal oscillatory motion due to the oscillatory driving means independently of said rotation; and water jet nozzle means disposed above and confronting each of the orange sectioning baskets and rotating together with the basket rotary plate, each of the nozzle means operating to section each orange within the respective basket into segments by jet water force, the orange segments so sectioned passing through said apertures into said water bath and floating upwardly to be discharged from the water vessel through said outlet together with said overflow water.

References Cited

UNITED STATES PATENTS 3,351,113  11/1967  Suzuki et al. _____ 146—230

W. GRAYDON ABERCROMBIE, *Primary Examiner.*